L. B. McCARGAR.
VEHICLE MOTOR POWER.
APPLICATION FILED MAR. 6, 1916.
1,226,785.
Patented May 22, 1917.
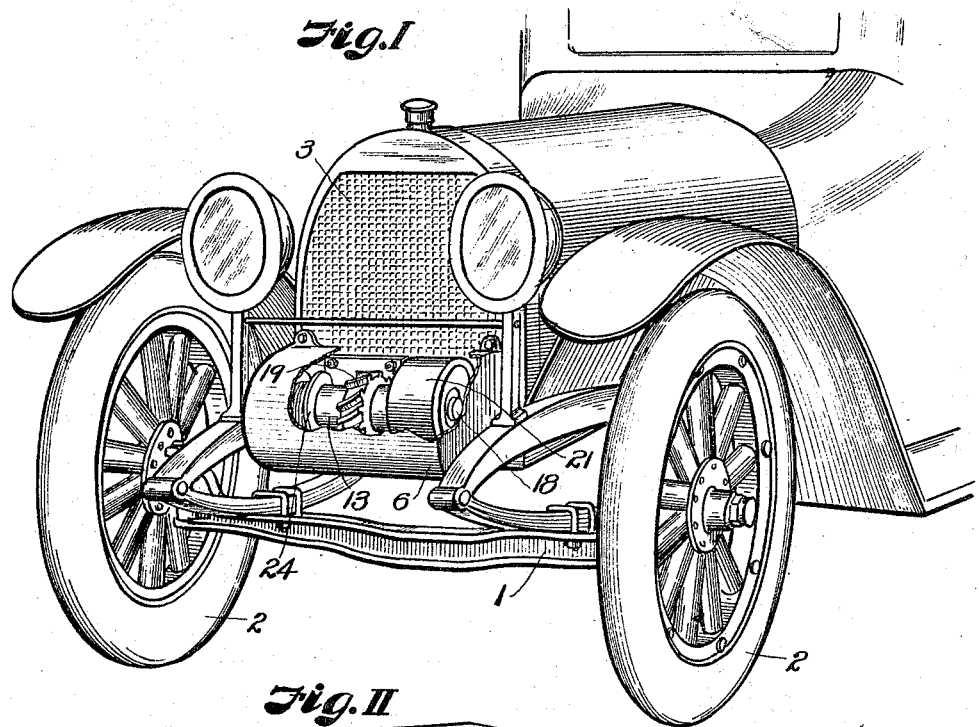
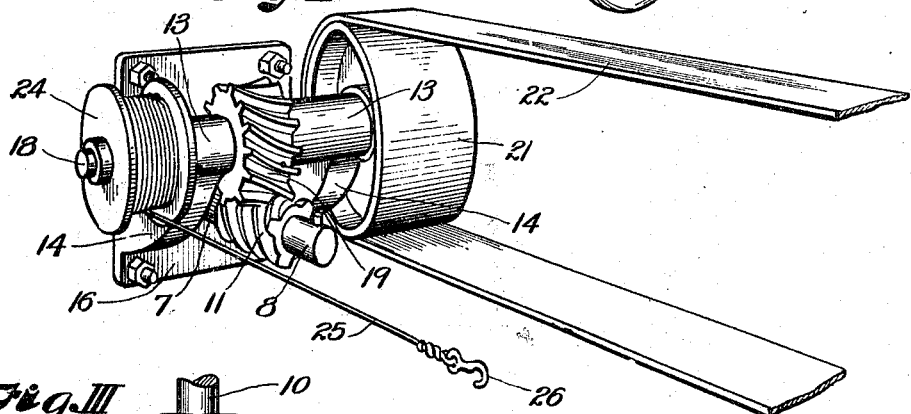
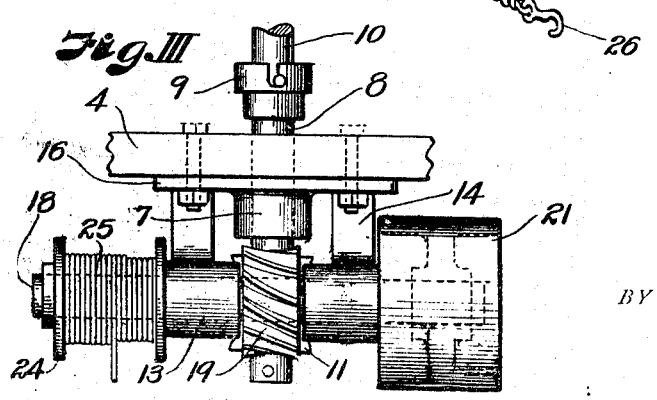
INVENTOR.
L. B. McCargar.
BY
Arthur C. Brown
ATTORNEY

UNITED STATES PATENT OFFICE.

LORREN B. McCARGAR, OF NORTH KANSAS CITY, MISSOURI.

VEHICLE-MOTOR POWER.

1,226,785. Specification of Letters Patent. Patented May 22, 1917.

Application filed March 6, 1916. Serial No. 82,384.

*To all whom it may concern:*

Be it known that I, LORREN B. McCARGAR, a citizen of the United States, residing at North Kansas City, in the county of Clay and State of Missouri, have invented certain new and useful Improvements in Vehicle-Motor Power; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an auxiliary power device for motor driven vehicles, and has for its principal object to provide means operable by the vehicle motor for driving an auxiliary mechanism, such as a feed-mill or the like or for operating a drum whereby the vehicle may be drawn out of the mud under its own power.

In accomplishing this object, I have provided improved details of structure, the preferred forms of which are illustrated in the accompanying drawings, wherein:—

Figure I is a perspective view of a motor driven vehicle equipped with my improvement, a part of the auxiliary housing being broken away to show the driving mechanism, and the driven parts.

Fig. II is an enlarged detail perspective of the auxiliary power device, illustrating the operation of the auxiliary drivers.

Fig. III is a plan view of the same, particularly illustrating the mounting of the auxiliary mechanism on the vehicle frame and the connection of the auxiliary shaft with the motor shaft.

Referring more in detail to the drawings:—

1 designates the front axle, 2 the front ground wheels, 3 the radiator, and 4 (Fig. III) a part of the frame of a motor driven vehicle of any ordinary construction. Fixed to the frame 4, and spaced from the front of the radiator is an auxiliary housing 6, which is adapted for containing the auxiliary power mechanism hereinafter described, and journaled in a bearing 7, and extending through the frame 4 is an auxiliary shaft 8, the rear end of which carries a clutch member 9 whereby the shaft may be operatively connected with the motor shaft 10 and the forward end of which carries a worm-drive wheel 11.

Journaled in bearings 13, on arms 14, that are fixed to a base plate 16, which is attached to the frame members 4, is a transverse shaft 18, and fixed to said shaft between the bearings is a vertical worm wheel 19, that meshes with the worm-drive wheel 11 to operate the horizontal transverse shaft 18 when the drive wheel is in operative relation with the motor drive shaft. The transverse shaft 18 extends beyond the ends of the bearings 13 and fixed to one end of the shaft is a pulley wheel 21 that is adapted for carrying a belt 22 that may be run over a corresponding belt wheel (not shown) of a feed-mill or other piece of machinery, so that the said mill or machinery may be driven from the vehicle motor, and fixed to the opposite end of the shaft 18 is a drum 24, having a cable 25 attached to and wound thereon. The cable 25 is preferably provided at its free end with a hook 26 that may be attached to any suitable anchor post or the like in order that should the vehicle carrying the auxiliary power device stall in the mud, or in a position where it cannot get sufficient traction for driving purposes, the cable may be let out from the drum and its free end attached to a suitable anchor so that when the auxiliary power device is energized, the cable may be wound on the drum to draw the vehicle forwardly.

Under ordinary conditions the auxiliary power device is completely housed so that it is not observable, but should the vehicle upon which the device is mounted become stalled by sticking in the mud, or otherwise, the housing may be removed and the cable let out from the drum and attached to a suitable anchor, the auxiliary drive mechanism may then be connected with the motor shaft through the clutch and the drum revolved to wind up the cable, the winding of the cable on the drum drawing the vehicle forwardly and removing it from its stalled condition.

If it is desired to drive a mill or other piece of machinery from the vehicle motor a belt may be run over the pulley 21, and over the belt wheel of the auxiliary machine, and the machine driven from the belt power in the ordinary manner.

It is apparent that the worm-drive will operate the shaft to actuate either the pulley or the cable drum, and that as the auxiliary device is connected with the motor shaft only when in actual use, there is no lost power, and no unnecessary noise because of operating parts.

Having thus described my invention, what I claim as new therein and desire to secure by Letters-Patent, is:—

The combination with a vehicle frame, of a plate arranged vertically at the front of the frame, arms extending upwardly and forwardly from the plate and provided with bearings, a transverse shaft rotatable in the bearings, a worm wheel on said shaft between the bearings, a pulley on one end of the shaft, a cable drum on the opposite end of the shaft, an auxiliary shaft rotatably mounted in said plate and extending longitudinally with the vehicle, and a worm drive wheel on the auxiliary shaft, meshing with the worm wheel on the transverse shaft.

In testimony whereof I affix my signature.

LORREN B. McCARGAR.